United States Patent [19]

Fujimori et al.

[11] Patent Number: 5,495,297
[45] Date of Patent: Feb. 27, 1996

[54] SIGNAL CONVERTING APPARATUS

[75] Inventors: Yasuhiro Fujimori; Tetsujiro Kondo, both of Kanagawa, Japan

[73] Assignee: Sony Corporation, Tokyo, Japan

[21] Appl. No.: 281,166

[22] Filed: Jul. 27, 1994

[30] Foreign Application Priority Data

Jul. 29, 1993 [JP] Japan .................................. 5-207049
Dec. 10, 1993 [JP] Japan .................................. 5-341603

[51] Int. Cl.$^6$ .................................................. H04N 9/75
[52] U.S. Cl. ......................... 348/590; 348/591; 348/592
[58] Field of Search .................................. 348/590–600,
348/584, 586, 587, 623, 576, 577, 578,
618, 619; 345/113, 114, 136, 138, 153,
155; 382/36, 50; H04N 9/74, 9/75, 9/76

[56] References Cited

U.S. PATENT DOCUMENTS

| | | | |
|---|---|---|---|
| 4,698,666 | 10/1987 | Lake, Jr. et al. | 348/586 |
| 4,771,192 | 9/1988 | Jackson | 348/586 |
| 4,947,240 | 8/1990 | Hausdorfer | 348/592 |
| 5,051,828 | 9/1991 | Chaplin | 348/590 |
| 5,070,397 | 12/1991 | Wedderburn-Bisshop | 348/591 |
| 5,287,093 | 2/1994 | Amano et al. | 348/595 |

FOREIGN PATENT DOCUMENTS

| | | | |
|---|---|---|---|
| 0146681 | 6/1988 | Japan | H04N 9/750 |
| 2211791 | 8/1990 | Japan | H04N 9/750 |
| 2243515 | 10/1991 | United Kingdom | H04N 9/740 |

*Primary Examiner*—Victor R. Kostak
*Assistant Examiner*—Michael H. Lee
*Attorney, Agent, or Firm*—William S. Frommer

[57] ABSTRACT

A color region extracting portion detects a specific color region from an input foreground image signal. A mapping portion categorizes an output signal of the color region extracting portion as a class. A high level resolution signal is generated with a predicting coefficient pre-learnt corresponding to the class. A threshold value Th is supplied from a terminal to a stretching portion. The stretch portion performs a stretching process. The stretching portion supplies a coefficient k as a key signal to a multiplier and a compensation signal generating portion. The compensation signal generating portion supplies a coefficient (1–k) to a multiplier. The multiplier multiplies the coefficient k by the coefficient (1–k) and outputs the result as a composite image of the foreground image and the background image.

11 Claims, 5 Drawing Sheets

Fig. 8
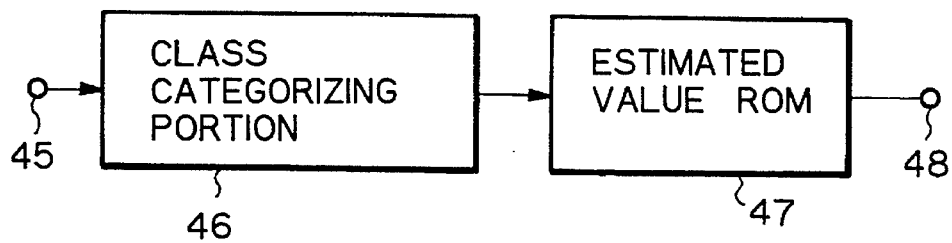
Fig. 9A (PRIOR ART)
Fig. 9B (PRIOR ART)
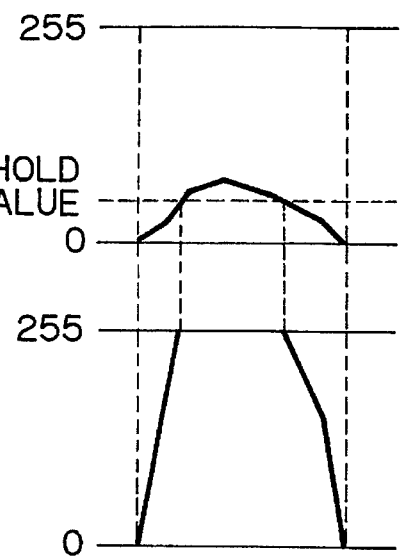
Fig. 10 (PRIOR ART)
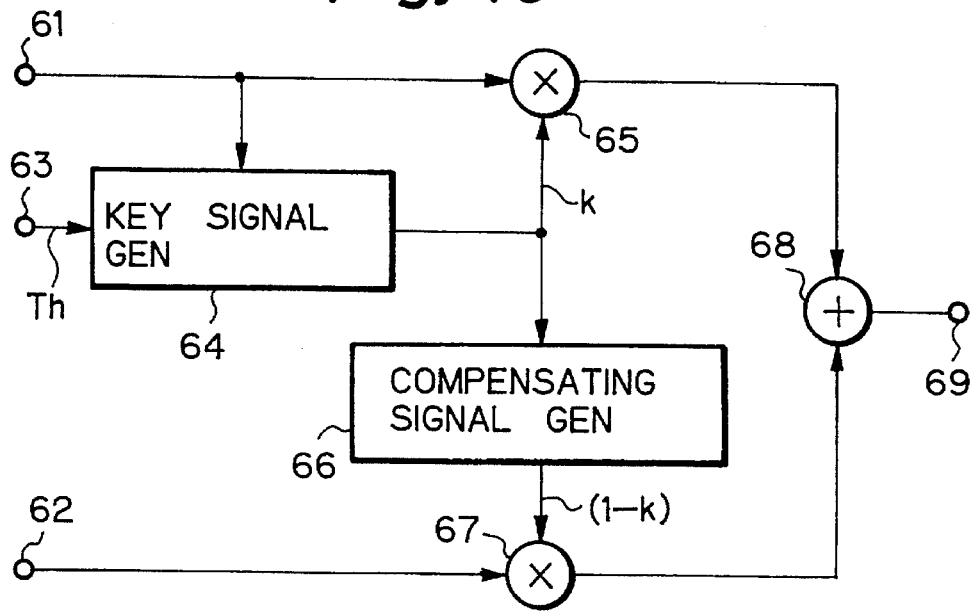

SIGNAL CONVERTING APPARATUS

BACKGROUND OF THE INVENTION

1. Field of the Invention

The present invention relates to a signal converting apparatus for switching a plurality of images and generating a composite image, in particular to, a signal converting apparatus for generating a key signal for switching images.

2. Description of the Prior Art

A signal converting apparatus that switches a plurality of images and generates a composite image, a chromakey unit, a switcher, a video effector, and the like are known. In the chromakey unit, a specific color is designated to one image (foreground image) of at least two types of images. The color portion is substituted with another color (background image) so as to generate a compound image.

The color designating switching signal is referred to as a key signal. A means for preventing a switched portion of an image from deteriorating is employed. As an example of factors that cause such deterioration, quantizing noise of a key signal is known. As switching methods of two types of images with a key signal, a hard key method and a soft key method are available. The hard key method is used to switch images with a binary key signal. The soft key method is used to provide intermediate levels. In these methods, a key signal for a designated color contained in a foreground image is compared with a threshold value. Thereafter, images to be switched are enlarged. This process is referred to as a stretching process. The magnification of the stretched image is referred to as stretch gain.

FIG. 10 schematically shows a construction of a conventional digital chromakey apparatus. Two types of image signals, a foreground image signal and a background image signal, are supplied from input terminals 61 and 62, respectively. With the foreground image signal received from the input terminal 61, the region of a specific color is extracted. FIG. 9A shows an example of the extracted signal. In this example, a signal in the range from 0 to threshold value (see FIG. 9A) is converted into a signal in the range from 0 to 255 (see FIG. 9B). In this example, since data is handled with eight bits, it is represented with values in the range from 0 to 255. Each pixel contained in an image signal is composed of eight bits.

In FIG. 10, a threshold value Th is variable. The threshold value Th is supplied from outside of the apparatus to a key signal generating portion 64 through the terminal 63. With the threshold value Th, the key signal generating portion 64 performs a stretch process. A multiplier 65 multiplies the foreground image signal by a coefficient k of the key signal supplied from the key signal generating portion 64. A multiplier 67 multiplies the background image signal received from the input terminal 62 by a coefficient (1−k) of the key signal supplied from the key signal generating portion 64 through a compensation signal generating portion 66. An adder 68 adds the outputs of the multipliers 65 and 67 so as to combine the images. Thus, a composite image where the foreground image is incorporated into the background image is generated. Thus, the composite image is obtained from an output terminal 69.

A composite image generated by the conventional chromakey apparatus is deteriorated because of the stretch process performed for generating a key signal.

In the example shown in FIGS. 9A and 9B, the stretch gain is "5". The quantizing noise is proportional to the stretch gain. In other words, as the stretch gain increases, the image deterioration takes place. When a clear cup filled with water is foreground image and the image is switched with a soft key, a composite image with remarkable quantizing noise that appears inside the glass is generated. As an example of the countermeasures against the quantizing noise, an image with small stretch gain may be selected. As another example, the number of transmission quantizing bits may be increased. However, the method for increasing the number of transmission quantizing bits has a problem on transmission line.

Therefore, an object of the present invention is to provide a signal converting apparatus for performing a stretch process without increasing quantizing noise of an image switching signal.

SUMMARY OF THE INVENTION

The present invention is a signal converting apparatus for switching a plurality of images with a key signal so as to generate a composite image, comprising a storage means for storing a predicting coefficient value pre-learnt for each class of signal waveforms of images, a class categorizing means for categorizing an input pixel value as a class, a means for calculating a coefficient value corresponding to the class obtained by the categorizing means so as to generate a pixel estimated value with a level resolution higher than the input pixel value, and a means for performing signal shaping corresponding to the pixel estimated value so as to generate a key signal.

According to the present invention, since level resolution of pixel data of an input image is increased, the quantizing distortion of a key signal is limited to an allowable range.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 8 is a block diagram showing a construction of the mapping portion according to the present invention;

FIGS. 9A and 9B are schematic diagrams for explaining a stretching operation of a signal; and FIG. 10 is a block diagram showing a construction of a conventional signal converting apparatus.

DESCRIPTION OF PREFERRED EMBODIMENTS

Next, with reference to the accompanying drawings, a signal converting apparatus according to an embodiment of the present invention will be described. As an example, an eight-bit digital image signal is converted into a ten-bit digital image signal. A switching key signal is generated corresponding to the 10-bit digital image signal. This data conversion is performed with a predicting coefficient that has been pre-learnt.

Figure 1:
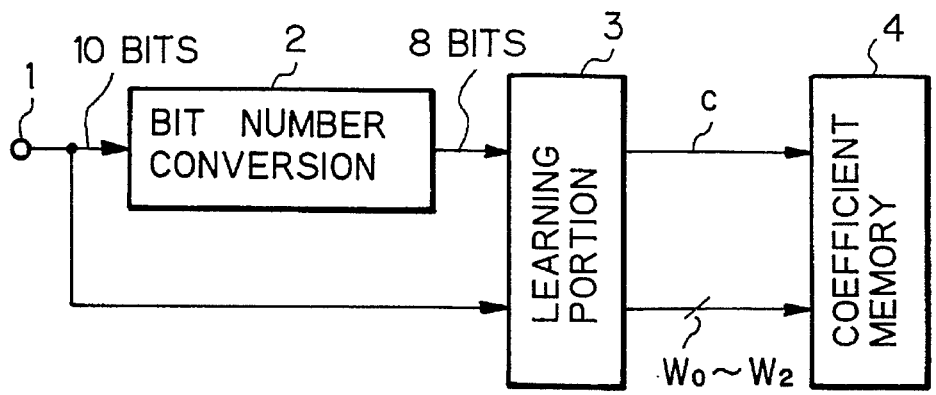
FIG. 1 is a block diagram showing a construction of a learning portion of a signal converting apparatus according to the present invention.

FIG. 1 is a block diagram showing a construction of a signal converting apparatus in a learning mode according to an embodiment of the present invention. Reference numeral 1 is an input terminal that receives a 10-bit original digital key signal. The original digital key signal is supplied to a bit number converting circuit 2 and a learning portion 3. It should be noted that an original digital key signal where a specific color region has been detected in a color region extracting portion (not shown) may be supplied from the input terminal 1.

The bit number converting circuit 2 converts a 10-bit original digital key signal into eight-bit original digital key data. As a simple example, the lowest order two bits may be removed from the 10-bit data. The 10-bit data received from the input terminal 1 is supplied to the learning portion 3. The bit number converting circuit 2 supplies the eight-bit data to the learning portion 3. The learning portion 3 outputs a class code c and predicting coefficients w0, w1, and w2 to a predicting coefficient memory 4. The class code c and the predicting coefficients w0, w1, and w2 are generated by a particular method that will be described later. The predicting coefficient memory 4 stores the class code c and the predicting coefficients w0, w1, and w2.

Figure 2:
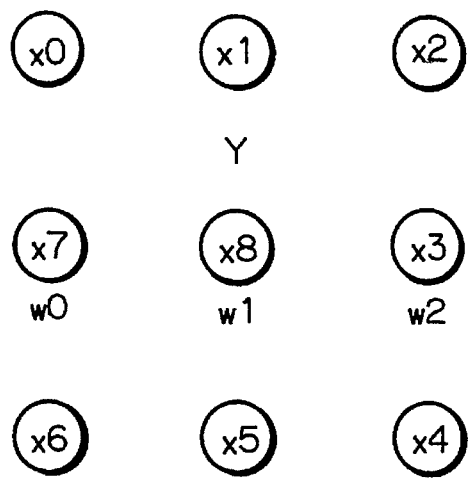
FIG. 2 is a schematic diagram for explaining image data according to an embodiment of the present invention.

FIG. 2 shows an arrangement of pixels (sample values) according to the embodiment. The key signal has a one-dimensional waveform that deteriorates time by time. FIG. 2 shows pixels (sample values) where the key signal is converted into time sequence and two-dimensionally distributed. With $x_0$ to $x_2$ of the eight-bit data $x_0$ to $x_8$ and the 10-bit data Y, the predicting coefficients $w_0$, $w_1$, and $w_2$ are learnt. Each eight-bit data is represented with a linear combination expression given by formula (1).

$$Y = w_0 x_0 + w_1 x_1 + w_2 x_2 \qquad (1)$$

The learning portion 3 generates a normal equation corresponding to a plurality of signal data substituted into the formula (1). By the method of least squares, the predicting coefficients $w_0$, $w_1$, and $w_2$ are determined so that the square of error is minimized. As an example, when one-bit ADRC (Adaptive Dynamic Range Coding) that will be described later is employed, eight-bit class code c can be extracted from eight pixels y ($x_0$ to $x_7$) excluding a considered pixel $Y(x_8)$ that is composed of 10 bit data contained in a (3×3) block as shown in FIG. 2. In the one-bit ADRC, when the following formula is satisfied, data "1" is formed as output data. Otherwise, data "0" is formed as output data.

$$(y - \text{MIN})/\text{DR} \geq 0.5 \qquad (2)$$

When eight-bit class code is for example (01011001), a plurality of learning objects may be present due to the relation of the minimum value MIN of pixels in the block and the dynamic range DR. When a normal equation is generated with these learning objects, a distribution of pixels with small dynamic range DR (namely, a distribution of pixels with small activities) are excluded from the learning objects. This is because a distribution of pixels with small activities is adversely affected by noise. Thus, this distribution often deviates from a true estimated value of the class. Thus, to prevent the predicting accuracy from lowering, the distribution of pixels with small activities are excluded from the learning objects.

When the class code c is (00000000) or (11111111), the dynamic range DR is "0". At this point, a normal equation for learning can be created. However, since the one-bit ADRC (namely, formula (2)) is not satisfied, the class code c cannot be generated. Thus, as an exception, when the dynamic range DR is "0", known data (for example, a perfect average value) may be used.

When ADRC is used for class categorization, activities are determined with a dynamic range when DPCM (Differential Pulse-Code Modulation) is used instead of the ADRC, differential absolute sum may be used for determining activities. When BTC (Block Truncation Coding) is used, the absolute value of standard deviation may be used for determining activities.

Figure 3:
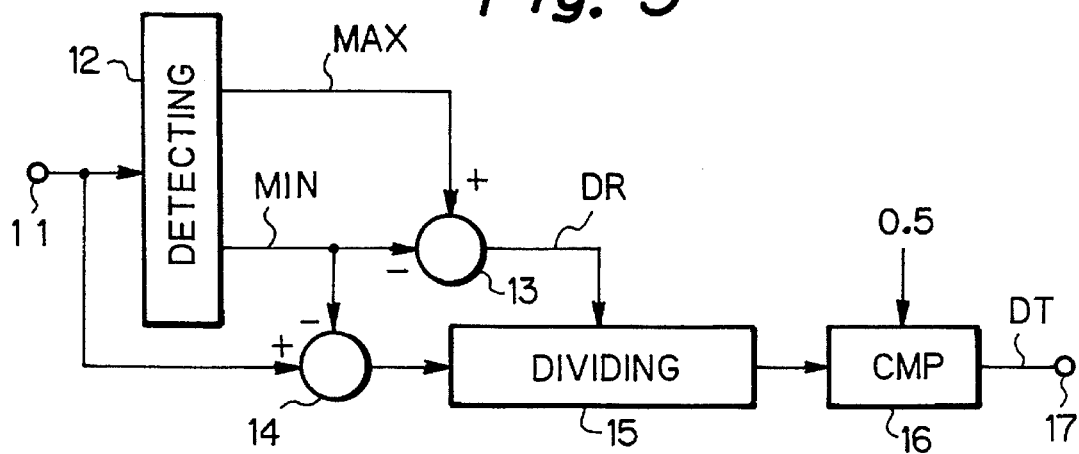
FIG. 3 is a block diagram for explaining one-bit ADRC.

Next, as shown in FIG. 2, with a considered pixel Y, one-bit ADRC for classifying pixel data of a (3×3) block into classes will be described. In FIG. 3, a detecting circuit 12 detects a maximum value MAX and a minimum value MIN for each block with respect to the block-sequence data received from the input terminal 11. The MAX and MIN are supplied to a subtracting circuit 13. The subtracting circuit 13 outputs a dynamic range DR. The input data and the MIN are supplied to a subtracting circuit 14. The subtracting circuit 14 subtracts the minimum value from the input data and outputs normalized pixel data.

The dynamic range DR is supplied to a dividing circuit 15. The dividing circuit 15 divides the normalized pixel data by the dynamic range DR. The output data of the dividing circuit 15 is supplied to a comparing circuit 16. The comparing circuit 16 determines whether or not the divided output of each of eight pixels other than the considered pixel is larger than 0.5. The comparing circuit 16 outputs data DT with "1" or "0". The data DT is obtained from an output terminal 17. When the class categorization is performed by the one-bit ADRC, a class code of a (3×3) block can be represented with eight bits.

Figure 4:
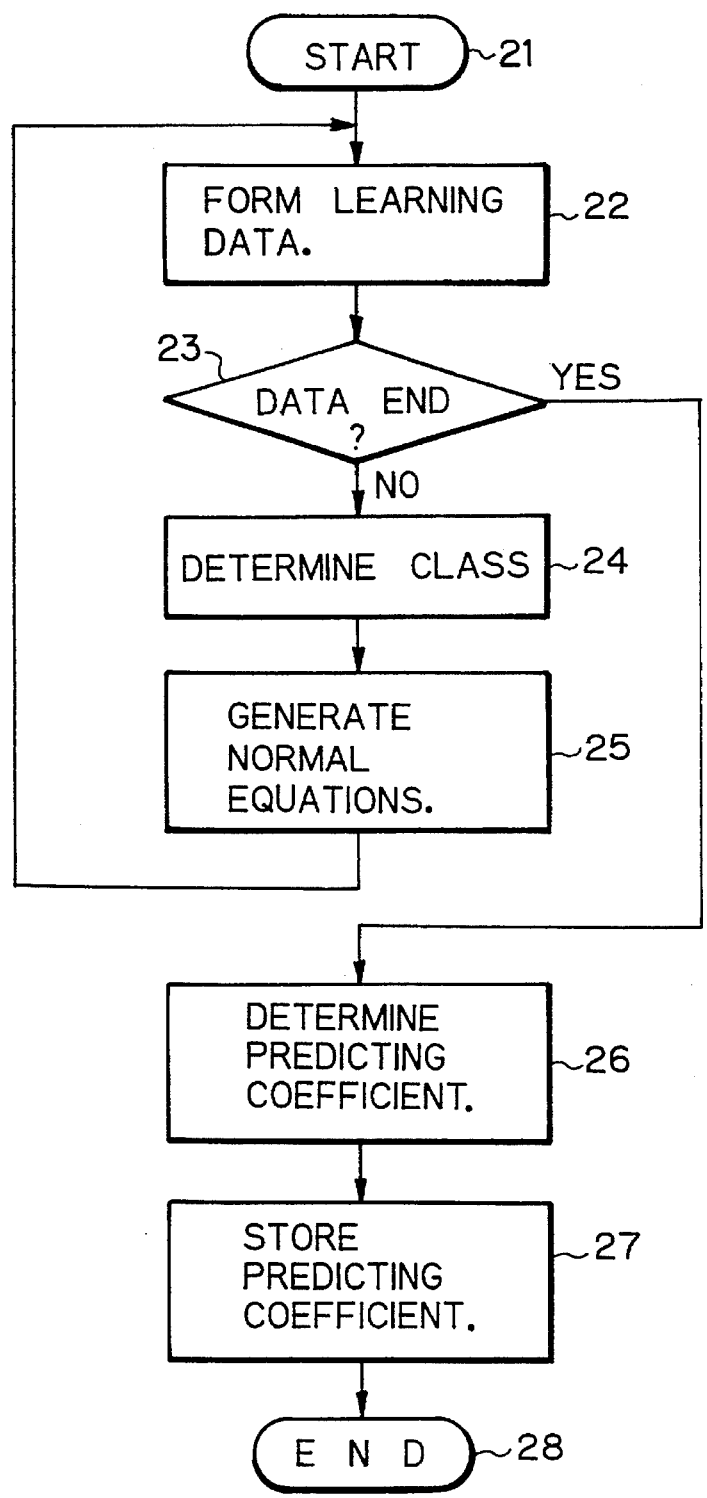
FIG. 4 is a flow chart for learning a predicting coefficient according to the present invention.

FIG. 4 is a flow chart showing the operation of software that performs the above-described learning operation. A learning process starts at step 21. At step 22 "FORM LEARNING DATA", learning data corresponding to a known image is generated. In reality, the arrangement of pixels shown in FIG. 2 may be used. A distribution of pixels whose dynamic range DR is smaller than the threshold value (namely, activity) is not treated as learning data. At step 23 "DATA END", it is determined whether or not all input data (for example, data of one frame) have been processed. When the determined result at step 23 is YES, the flow advances to step 26 "DETERMINE PREDICTING COEFFICIENT". When the determined result at step 23 is NO, the flows advances to step 24 "DETERMINE CLASS".

At step 24 "DETERMINE CLASS", input learning data is categorized as a class. Data of reference pixel where information amount has been compressed by ADRC or the like is used. At step 25 "GENERATE NORMAL EQUATIONS", normal equations (8) and (9), which will be described later, are generated.

After all data have been processed at step 23 "DATA END", the flow advances to step 26. At step 26 "DETERMINE PREDICTING COEFFICIENT", formula (10) that will be described later is solved with a matrix solution so as to determine a predicting coefficient. At step 27 "STORE PREDICTING COEFFICIENT", the predicting coefficient is stored in memory. At step 28, the learning process is finished.

Next, the step 25 "GENERATE NORMAL EQUATIONS" and step 26 "DETERMINE PREDICTING COEFFICIENT" will be described in more detail. Assume that the true value of a considered pixel is y, that the estimated value thereof is y', and that values of pixels adjacent thereto are $x_1$ to $x_n$. For each class, with coefficients $w_1$ to $w_n$ (namely, n taps), a linear combination expression is formed.

$$y' = w_1 x_1 + w_2 x_2 + \ldots + w_n x_n \quad (3)$$

Before the learning operation is performed, $w_i$ is an unknown coefficient.

As described above, the learning operation is performed class by class. If the number of data is m, the formula (3) can be expressed as follows.

$$y_j' = w_1 x_{j1} + w_2 x_{j2} + \ldots + x_n x_{jn} \quad (4)$$

where j=1, 2, ..., m.

When m>n, since $w_1$ to $w_n$ are not uniquely determined, elements of error vector E are defined as follows.

$$e_j = y_j - (w_1 x_{j1} + x_2 x_{j2} + \ldots + w_n x_{jn}) \quad (5)$$

where j=1, 2, ..., m.

Next, coefficients where the value of the following formula (6) is minimum are obtained.

$$E^2 = \sum_{j=0}^{m} \{e_j\}^2 \quad (6)$$

In other words, the error vector E is obtained by the method of least squares. Here, a partial differential coefficient of the formula (6) is solved with respect to $w_i$.

$$\frac{\partial E^2}{\partial w_i} = \sum_{j=0}^{m} 2\left(\frac{\partial e_j}{\partial w_i}\right) e_j = \sum_{j=0}^{m} 2 x_{ji} \cdot e_j \quad (7)$$

$w_i$ is determined so that the formula (7) becomes "0".

$$X_{ji} = \sum_{p=0}^{m} x_{pi} \cdot x_{pj} \quad (8)$$

$$Y_i = \sum_{j=0}^{m} x_{ji} \cdot y_j \quad (9)$$

The formulas (8) and (9) can be expressed with a matrix.

$$\begin{pmatrix} X_{11} X_{12} \ldots X_{1n} \\ X_{21} X_{22} \ldots X_{2n} \\ \ldots \ldots \ldots \ldots \\ X_{n1} X_{n2} \ldots X_{nn} \end{pmatrix} \begin{pmatrix} w_1 \\ w_2 \\ \ldots \\ w_n \end{pmatrix} = \begin{pmatrix} Y_1 \\ Y_2 \\ \ldots \\ Y_n \end{pmatrix} \quad (10)$$

The equation (10) is referred to as a normal equation. When this equation is solved with respect to $w_i$ by conventional matrix method such as sweep out method, the predicting coefficient $w_i$ is obtained. The predicting coefficient $w_i$ is stored in the memory with an address of the class code.

When information is compressed, a reference pixel is converted into data with the same number of bits. However, in consideration of the distance between the considered pixel and the reference pixel, the number of bits assigned to the former may differ from the number of bits assigned to the later. In other words, the number of bits assigned to a reference pixel closer to the considered pixel is larger than the number of bits assigned to a reference pixel farther apart from the considered pixel.

Figure 5:
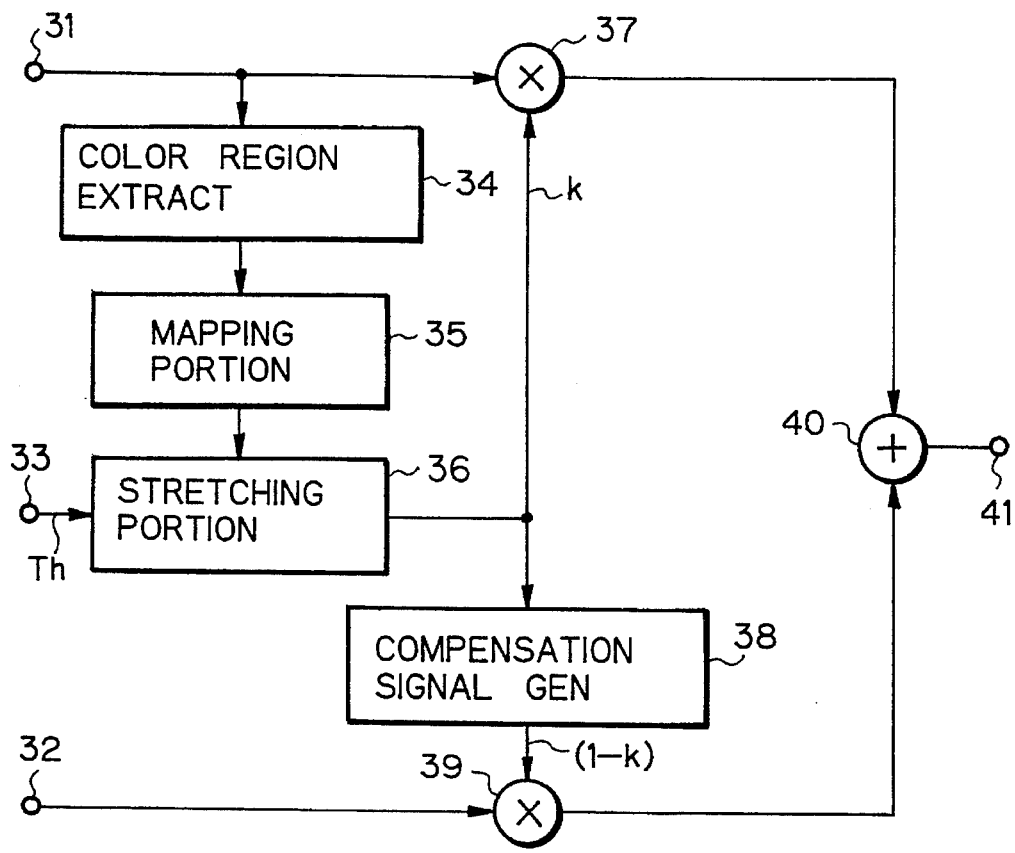
FIG. 5 is a block diagram showing a construction of the signal converting apparatus according to the present invention.

FIG. 5 is a block diagram showing a chromakey apparatus according to an embodiment of the present invention. Reference numeral 31 is an input terminal to which a foreground image signal is supplied. A specific color region of the foreground image is detected by a color region extracting portion 34. An output signal of the color region extracting portion 34 accords with a signal shown in FIG. 9A. The output signal of the color region extracting portion 34 is supplied to a mapping portion 35. The mapping portion 35 categorizes the input signal as a class. A mapping portion 35 generates a signal with resolution of 8 bits or higher corresponding to the pre-learnt predicting coefficient.

In other words, the mapping portion converts the specific color region signal of eight bits into for example a 10-bit signal. The converted signal is supplied from the mapping portion 35 to a stretching portion 36. In comparison with the conventional method where an eight-bit signal is stretched and a key signal is generated, since a 10-bit signal is stretched, quantizing noise can be decreased ¼ times as low as the prior art reference. In other words, the quantizing noise of a 10-bit signal that is stretched four times is the same as the quantizing noise of an eight-bit signal that is not stretched. In the process for improving the level of resolution, class categorization is performed so as to extract local characteristics of an image.

The threshold value Th received from the terminal 33 is supplied to the stretching portion 36. The stretching portion 36 stretches a 10-bit signal with levels of 0 to threshold value Th received from the mapping portion 35 to a value with levels from 0 to 255. The stretching portion 36 outputs an eight-bit key signal (with a gain that corresponds to a coefficient k). The coefficient k is supplied to a multiplier 37. The coefficient (1−k) received from a compensation signal generating portion 38 is supplied to a multiplier 39. The multiplier 37 multiplies the foreground image received from the input terminal 32 by the coefficient (1−k). An adder 40 adds an output signal of the multiplier 37 and an output signal of the multiplier 39. A composite image that is cross-faded and has less quantizing noise is obtained from an output terminal 31.

Figure 6:
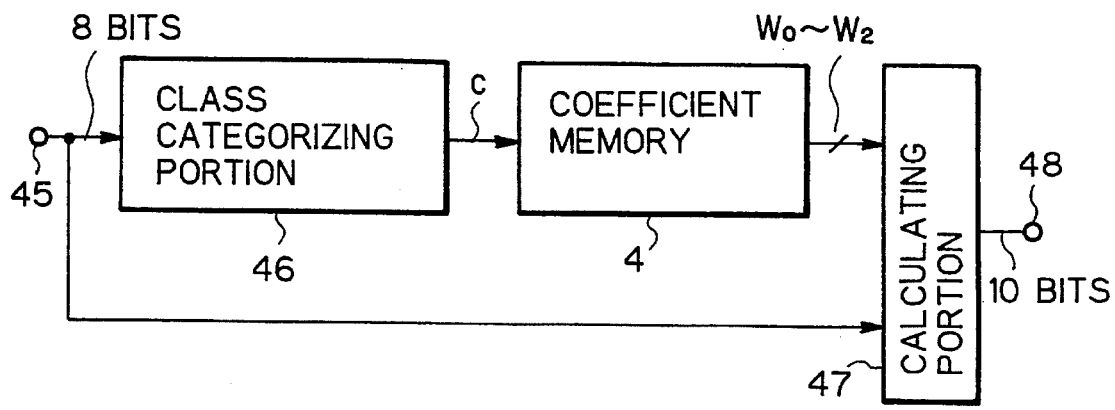
FIG. 6 is a block diagram showing a construction of a mapping portion according to the present invention.

Next, with reference to FIG. 6, the construction of the mapping portion 35 will be described. An eight-bit signal is received from an input terminal 45. The eight-bit signal is supplied to a class categorizing portion 46 and a predicting-value calculating portion 47. The class categorizing portion 46 may employ DPCM or BTC instead of ADRC so as to categorize data as a class and generate a class code c as with the learning process. When the number of classes is not limited, a class code c generated by PCM may be used as it is. However, since the class code is constructed of 8 bits ×8 pixels =64 bits, the number of classes becomes as large as $2^{64}$.

The output of the class categorizing portion 46, namely class code c, is supplied to a predicting coefficient memory 4. Predicting coefficients $w_0$, $w_1$, and $w_2$ corresponding to the class code c are read from the predicting coefficient memory 4. The eight-bit signal received from the input terminal 45 and the predicting coefficients $w_0$, $w_1$, and $w_2$ obtained from the predicting coefficient memory 4 are supplied to the predicting-value calculating portion 47. The predicating-value calculating portion 47 outputs an optimumly estimated value Y, which is 10 bit data, corresponding to the formula (1). The optimumly estimated value Y is obtained from an output terminal 48.

Figure 7:
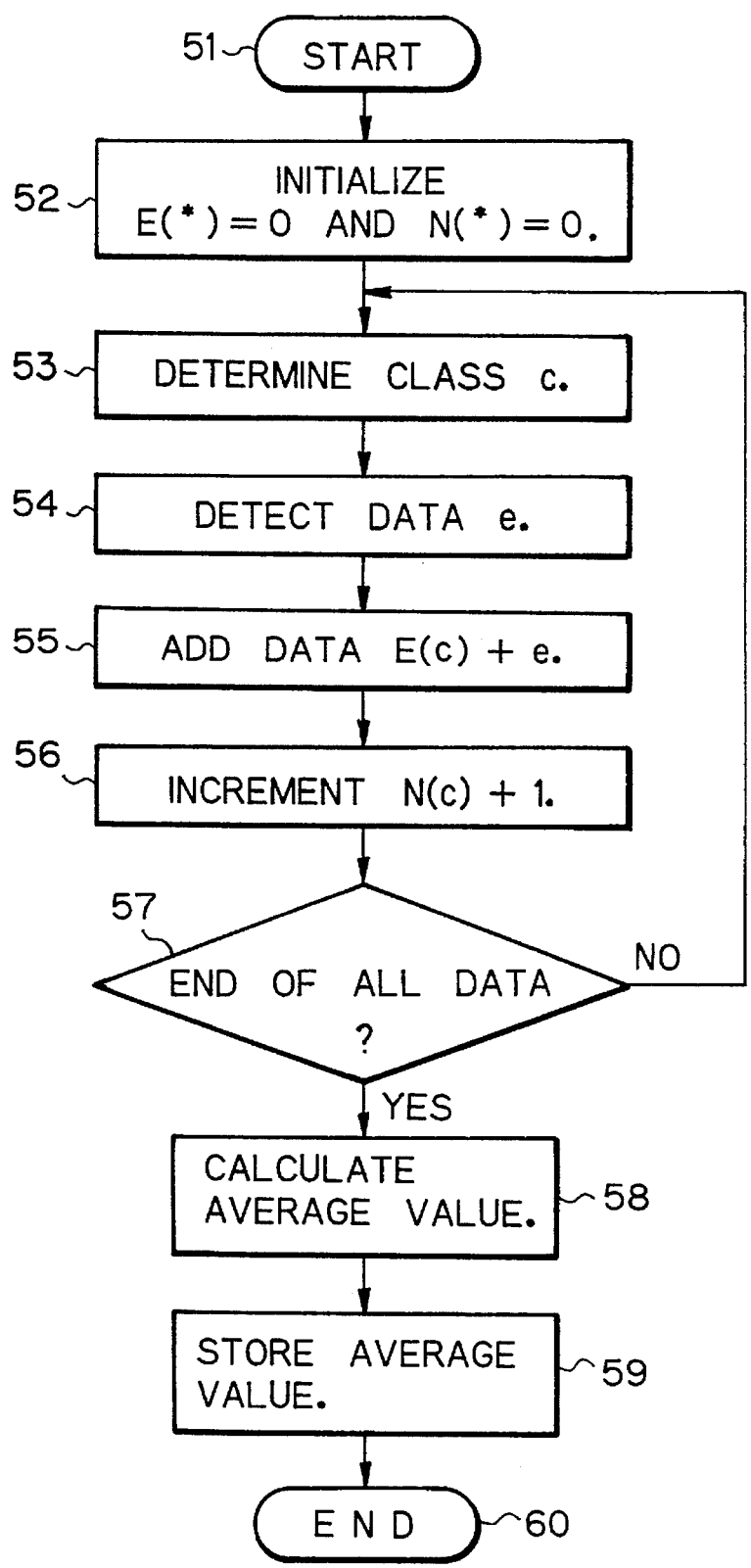
FIG. 7 is a flow chart for performing a learning operation corresponding to weighing method according to the present invention.

Next, another embodiment of the present invention will be described. In this embodiment, a learning operation is performed by software corresponding to weighing method. FIG. 7 shows a flow chart of the learning operation. At step 51, the flow of the learning operation starts. At step 52, "0" is written to all number-of-times counters N(*) and all data tables E(*) so as to initialize these counters and tables (where "*" represents all classes). The number-of-times counter corresponding to class $c_0$ is N($c_0$). The data table corresponding to class $c_0$ is E($c_0$). After step 52 "INITIALIZE E(*)=0 kND N(*)=0", the flow advances to step 53.

At step 53, a class c is determined with data adjacent to pixels to be learned around a considered pixel. At step 53

"DETERMINE CLASS c", the above-described PCM, ADRC, DPCM, BTC, or the like may be employed as a representation method. At step 54, a 10bit pixel value e to be learnt is detected. When the 10-bit pixel value e itself is detected, the difference from the reference value interpolated with the adjacent data may be detected as the pixel value e. This method may be used so as to improve the accuracy of the estimated value corresponding to the learning condition.

The flow advances from step 53 "DETERMINE CLASS c" and step 54 "DETECT DATA e" to step 55. At step 55 "ADD DATA E(c) +e", the pixel value e is added to the content of the data table E(c) of class c. Next, at step 56 "INCREMENT N(c)+1", the number-of-times counter N(c) of the class c is incremented by "+1".

At step 57, it is determined whether or not the flow has advanced from the step 53 "DETERMINE CLASS" to step 56 "INCREMENT N(c)+1". When all the data have been learnt, the determined result is "YES" and the flow advances to step 58. When all the data have not been learnt, the determined result is "NO" and the flow returns to step 53 "DETERMINE CLASS c". Until all the data have been learnt, this loop is repeated. The data table E(*) of all the classes corresponding to the number-of-times counter N(*) of all the classes are generated.

At step 58, the data table E(*) of each class that holds the cumulated value of the pixel value e is divided by the number-of-times counter N(*) of each class that holds the occurrences of the pixel value e. Thus, the average value of each class is obtained. This average value becomes the estimated value of each class. At step 59, the estimated value (average value) calculated at step 58 is stored, class by class. When the estimated value of each class has been registered, the flow advances to step 60 "END" where the learning operation is finished. In this method, an estimated value is generated with the average value of the distribution of the pixel values to be learnt. Thus, this method is referred to as weighing method. FIG. 8 shows the construction of the mapping portion 35 that performs the learning operation corresponding to the weighing method. An eight-bit signal received from an input terminal 45 is supplied to a class categorizing portion 46. The class categorizing portion 46 determines the class of the input signal and outputs a class code c to an estimated value ROM 47. The estimated value ROM 47 stores estimated values (10 bits), class by class. The estimated value ROM 47 outputs a 10-bit estimated value corresponding to the class code c being received.

According to the signal converting apparatus of the present invention, since the level resolution of a key signal in the stretching process and the later processes is improved, the increase of the quantizing noise can be suppressed. Thus, a composite image with high quality and less quantizing noise can be generated.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A signal converting apparatus for switching a plurality of images comprised of pixel values with a key signal so as to generate a composite image, comprising:

storage means for storing a plurality of predicting coefficient values pre-learnt for classes of pixel values;

class categorizing means for categorizing an input pixel value in a class and for generating a class signal;

means coupled to said storage means for generating a pixel estimated value with higher resolution than the input pixel value as a function of predicting coefficient values corresponding to said class signal; and means for performing signal shaping corresponding to the pixel estimated value so as to generate said key signal.

2. A signal converting apparatus for switching a plurality of images so as to generate a composite image, comprising:

class categorizing means for categorizing an input pixel value comprised of a first number of bits in a class and for generating a class signal;

means coupled to said class categorizing means for storing a predicted level value pre-learnt for each class of signal waveforms of the images and for outputting as a function of the class signal the predicted level value as a pixel estimated value;

said predicted level value comprising a second number of bits wherein said second number exceeds said first number; and means for performing signal shaping of the pixel estimated value so as to generate a key signal.

3. The signal converting apparatus as set forth in claim 1, wherein said class categorizing means is adapted for directly using the input pixel value.

4. The signal converting apparatus as set forth in claim 1, wherein said class categorizing means is adapted for performing ADRC encoding of the input pixel value and performing class categorization corresponding to an encoded value thereof.

5. The signal converting apparatus as set forth in claim 1, wherein said class categorizing means is adapted for performing DPCM encoding of the input pixel value and performing class categorization corresponding to an encoded value thereof.

6. The signal converting apparatus as set forth in claim 1, wherein said class categorizing means is adapted for performing BTC encoding of the input pixel value and performing class categorization corresponding to an encoded value thereof.

7. The signal converting apparatus as set forth in claim 1, wherein the predicting coefficient value is determined by learning, a pixel distribution with low activities of the input pixel value being excluded from an object to be learnt.

8. The signal converting apparatus as set forth in claim 1, wherein said means for generating a pixel estimated value comprises means for generating an optimum pixel estimated value corresponding to a linear combination expression of a plurality of input pixel values adjacent to a pixel to be estimated and at least one of said predicting coefficient values.

9. The signal converting apparatus as set forth in claim 1, wherein the predicting coefficient value is determined by a method of least squares so that the square of a true value and an error is minimized.

10. A digital chromakey apparatus for compositing a first digital image signal and a second digital image signal, comprising:

means for generating a key signal corresponding to the first digital image signal;

storage means for storing a predicting coefficient value pre-learnt for each class;

class categorizing means for categorizing the key signal in a class and for generating a class signal;

means for generating as a function of the predicting coefficient value corresponding to the class signal a pixel estimated value with higher resolution than the key signal; and means for performing a stretching process corresponding to the pixel estimated value.

11. A digital chromakey apparatus for compositing a first digital image signal and a second digital image signal, comprising:

means for generating a key signal comprised of a first number of bits corresponding to the first digital image signal;

class categorizing means for categorizing the key signal in a class and for generating a class signal;

means for storing a plurality of predicted level values pre-learnt for each class and for outputting as a function of said class signal one predicted level value as a pixel estimated value, each of said predicted level values comprising a second number of bits, said second number exceeding said first number; and means for performing a stretching process corresponding to the pixel estimated value.

* * * * *